United States Patent Office 3,518,100
Patented June 30, 1970

3,518,100
STABILIZED ZIRCONIA SHAPES
Dwight S. Whittemore, Pittsburgh, Pa., assignor to Dresser Industries, Inc., Dallas, Tex., a corporation of Delaware
No Drawing. Filed Oct. 30, 1967, Ser. No. 679,197
Int. Cl. C04b 35/48
U.S. Cl. 106—57      3 Claims

ABSTRACT OF THE DISCLOSURE

A stabilized zirconia of superior density especially suited for manufacture of ceramic dies and the like made of a refractory batch comprised of at least partially stabilized zirconia grain and a small amount of mullite.

---

Zirconia has the chemical formula $ZrO_2$. It can exist, under certain conditions, in three different crystalline forms; namely, the monoclinic, the tetragonal and the cubic. The monoclinic form usually exists between 0 and 1000° C., the tetragonal between 1000° C. and about 1900° C., and the cubic form exists from about 1900° C. to melting at about 2700° C. In a pure system, these crystal phase transformations are reversible, but such phase changes are always accompanied by an appreciable and undesirable variation in density. Hence, although the cubic phase is the most desirable for refractory purposes, it is distressingly unstable when pure. Therefore, zirconia, upon heating and cooling under normal refractory practices, does not exhibit reversible thermal expansion, but rather, its tendency to at least partially change its crystalline makeup during each heating and cooling cycle, eventually causes almost complete destruction of refractory shapes fabricated thereof. Therefore, to use the otherwise desirable refractory oxide which zirconia is, workers in the art have produced what is termed "stabilized zirconia."

Stabilized zirconia is zirconia substantially entirely exhibiting a cubic crystallite structure the individual crystals of which are "propped," as it were, to prevent their disintegration at lower temperatures. For example, calcium oxide is conventionally used to produce a stabilized zirconia refractory material. In practice, stabilization is brought about in one method by mixing from 3 to 6%, by weight, of 99+% calcium oxide with 97 to 94% zirconia. All of the calcium oxide and zirconia is very finely divided i.e., 100%–325 mesh. The mixture is heated to about 2900° F. and held for a period of time sufficient to induce complete stabilization of the zirconia crystals. The product which results is assigned the formula $(Ca \cdot Zr)O_2$. Material selected to stabilize zirconia must have an ionic radius substantially the same as the ionic radius of the zirconium ion. The zirconium ion, in cubic configuration, has an ionic radius of about .87 angstroms. $Ca^{++}$ ions exhibit an average ionic radius of about 1.06 angstroms. Other materials having an ion radius within about + or −20% of the .87 angstrom radius of the zirconia are also usable. For example, $Mg^{++}$, having an ionic radius of about 0.78 angstroms, is a good stabilizer. $Y^{+++}$, which has an ionic radius of about 1.06 angstroms, is also usable. In stabilizing zirconia, ions which make up the material used for stabilization appear to enter the cubic structure of zirconia replacing in part zirconium ions in the cubic form. The minor differences in ionic radius involved in these substitutions apparently prevent the phase changes which take place in the pure state, thereby stabilizing the structure in the cubic phase. The thus "stabilized" zirconia crystals exhibit remarkably uniform reversible thermal expansion. Also, when I use the word "stabilized" in referring to zirconia, I intend to describe less than 100% stabilization as well as completed stabilization. For example, 3 to 4% CaO will produce grain having only about 65 to 75% stabilization.

Such stabilized zirconia is remarkably inert to various corrosive alloys, and is a very desirable material for fabricating various items of ware. One use, however, which it was not entirely satisfactory for has been in machine tool applications; for example, for use as an extrusion die for aluminum or copper. Such applications require extremely dense and strong materials and it is the primary object of this invention to provide such a stabilized zirconia material.

Briefly, according to one aspect of the invention, finely divided stabilized zirconia (approximately 75% lime stabilizer) is mixed with 0.5 to 5 parts, by weight, of preformed mullite. The mix is pressed into shape and burned at 3200° F. to produce a dense, stabilized zirconia shape.

It is preferred to add 2% mullite according to the best practices now known. When I say "finely divided" I mean I prefer that all materials be finer than about 8 microns and preferably less than about 2 microns as determined by the Fisher sub-sieve analyzer. Simply ball milling the ingredients is also satisfactory. However, the finer the material the better the sintering or firing thus providing a better ceramic bonding through batch constituents.

The following table is illustrative of actual laboratory testing.

| | Mixes bearing mullite | | |
|---|---|---|---|
| Mix | A | B | C |
| Partially stabilized (about 75%) zirconia, percent | 100 | 100 | 100 |
| Pressed, 22,000 p.s.i., 7/8" diameter cylinders, burn, 3,300° F., 5 hours: | | | |
| Bulk density (pcf.) (avg. 4) | 330 | 339 | 308 |
| Apparent specific gravity (avg. 4) | 5.29 | 5.43 | 4.93 |

Mixes according to this invention can have as much as 10% mullite but I do not suggest, for best results, more than 5% or parts, by weight, since larger amounts of the mullite tend to destabilize the zirconia with time by preferentially reacting with the zirconia-stabilizing agent. Also, I have mentioned 0.5 as a lower limit. However, in its broadest aspect, my invention is comprised of adding an amount of mullite effective to increase density appreciably.

I prefer to use preformed mullite but separate alumina and silica ingredients can be used which will react in firing to form mullite. However, I do not suggest this approach for best results since there will be some destabilization of the zirconia by reaction of the silica and/or alumina with some of the zirconia stabilizing agent.

Having thus described the invention in detail and with sufficient particularity as to enable those skilled in the art to practice it, what is desired to have protected by Letters Patent is set forth in the following claims.

I claim:
1. Ceramically bonded stabilized zirconia ware consisting essentially of stabilized zirconia and an amount of mullite sufficient to increase the density of the ware.
2. The ware of claim 1 in which the mullite is present in the range 0.5 to 10 parts by weight.
3. The ware of claim 1 in which the mullite amounts to about 2 parts by weight.

References Cited

UNITED STATES PATENTS 2,937,102   5/1960   Wagner _____ 106—57

JAMES E. POER, Primary Examiner

U.S. Cl. X.R.

106—65